Feb. 2, 1965 R. A. FRYKLUND 3,168,733
CATHODE RAY TUBE DISPLAY SYSTEMS
Filed May 25, 1961 3 Sheets-Sheet 3
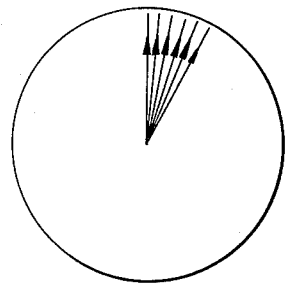
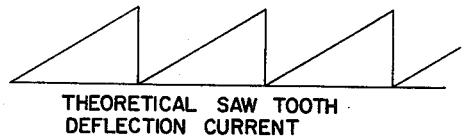
THEORETICAL SAW TOOTH
DEFLECTION CURRENT
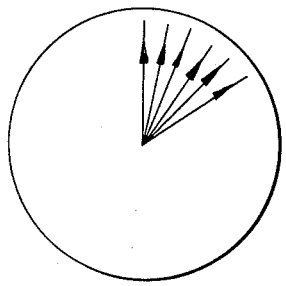
SAW TOOTH
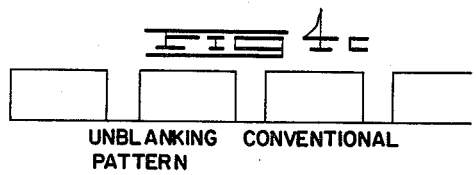
UNBLANKING CONVENTIONAL
PATTERN
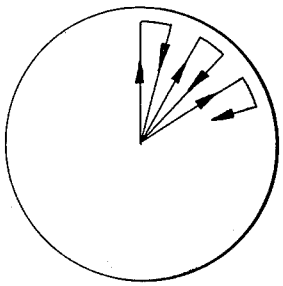
MODIFIED TRIANGULAR
INVENTOR
ROBERT A. FRYKLUND, DECEASED
BY DOROTHY H. FRYKLUND, ADMINISTRATRIX
BY *Herbert W. Arnold*
ATTORNEY United States Patent Office 3,168,733
Patented Feb. 2, 1965

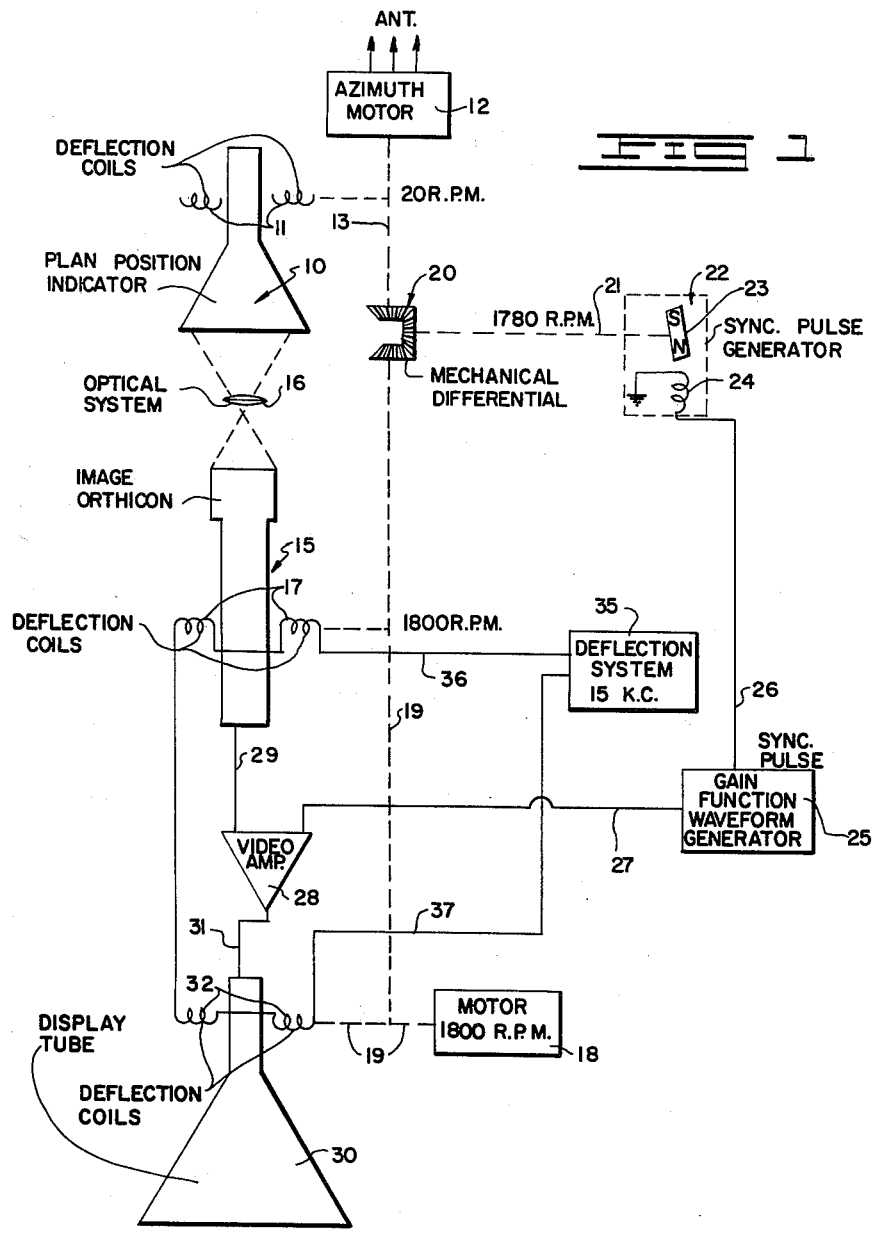

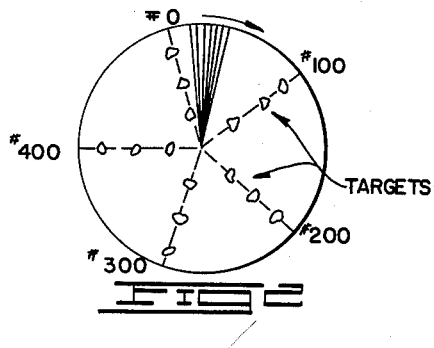
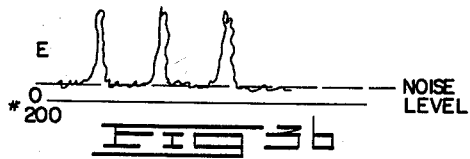
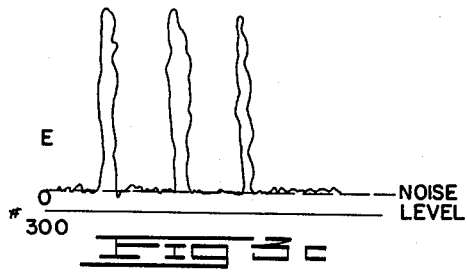
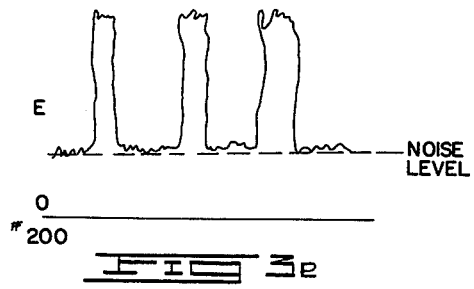
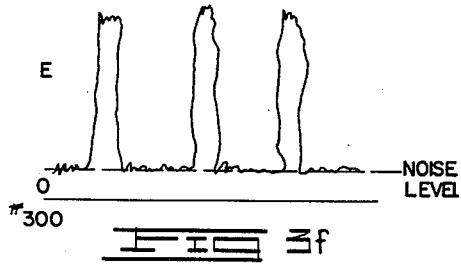

3,168,733
CATHODE RAY TUBE DISPLAY SYSTEMS
Robert A. Fryklund, deceased, late of Dedham, Mass., by Dorothy H. Fryklund, administratrix, Dedham, Mass., assignor to Raytheon Company, Lexington, Mass., a corporation of Delaware
Filed May 25, 1961, Ser. No. 112,736
8 Claims. (Cl. 343—11)

The present invention relates to a cathode-ray-tube display system, and more particularly to a cathode-ray-tube display system for electrical signals, such as, for example, radar signals, which produces a bright display on the screen of the cathode ray tube of the electric signals and which utilizes presently available, conventional cathode ray tubes without the need for storage or memory tubes or the like.

Conventional prior art cathode ray display tubes, such as used in connection with plan position indicators rely for proper operation and adequate display of the electric signals thereon on those types of cathode ray tubes having a screen provided with a coating consisting of long-persistence phosphors to provide illumination of the displayed signals on the screen of the tube. However, the phosphorous materials of the prior art, which produce a relatively long persistence in the display of the electric signals, entail also the known disadvantage of relatively low brightness.

While phosphorous materials of relatively considerable brightness are available for purposes of coating the screens of cathode ray tubes, these known materials are of little use in connection with cathode ray display systems such as plan position indicators as used in the prior art because they do not possess a sufficiently long persistence to produce the desired display effect on the screen of the cathode ray tube.

In the absence of materials adapted to be used with cathode ray tubes which combine the properties of long persistence and high brightness, there is a great need for solving the problem of adequate visibility in connection with the display on the cathode ray tubes of electric signals such as, for example, of radar signals corresponding to targets detected by the radar system.

It is also known in the prior art to utilize memory tubes or storage devices on which the information normally displayed on the long-persistence plan position indicator cathode ray tubes is stored for subsequent redisplay on the screen of an appropriate cathode ray tube or other indicator. However, memory tubes or storage devices, as known in the prior art, are relatively expensive, and the circuitry involved to supply the signals to the memory tube or storage device for storing the same in the tube as well as those necessary for read-out of the signals are relatively complicated, and thereby increase the cost of the overall installation.

Accordingly, it is an object of the present invention to provide a display system which obviates the inadequacies and shortcomings of the conventional prior art cathode-ray-tube display systems, particularly of the prior art plan position indicator systems.

It is another object of the present invention to provide a system providing relatively bright display while utilizing standard cathode ray tubes having a coating consisting of conventional phosphorous material providing a relatively long persistence with relatively low brightness.

Still another object of the present invention resides in the provision of a plan position indicator system which effectively eliminates the need for compromise between the previously irreconcilable requirements for long persistence and high brightness desired with plan position indicator systems.

Still a further object of the present invention resides in the provision of a plan position indicator system which is simple in construction, utilizes standard, conventional parts, yet effectively eliminates, with the use of standard cathode ray tubes, the inadequacies concerning sufficient brightness of the signal display thereon encountered with the prior art systems.

Another object of the present invention resides in the provision of a bright-display system which is relatively simple and inexpensive and obviates the need for memory tubes or the like.

A further object of the present invention resides in the provision of a bright-display system utilizing cathode ray tubes to which true-motion techniques can be readily applied.

Another object of the present invention is a bright-display system having a relatively superior angular resolution by the use of a scanning system eliminating or minimizing the fly-back time necessary in connection with conventional scanning systems.

These and other features of the present invention will become apparent from the following description taken in connection with the accompanying drawing, which shows, for purposes of illustration only, one embodiment in accordance with the present invention, and wherein:

FIGURE 1 is a schematic diagram of a bright-display system in accordance with the present invention, FIGURE 2 is a typical display picture obtained from a plan position indicating system, FIGURES 3(a) through (f) are typical wave forms obtained in a bright-display system according to the present invention, and FIGURES 4(a) through (d) are wave forms for deflection voltages that may be used with the display system in accordance with the present invention.

The present invention essentially seeks to achieve a bright display of signals on cathode ray tubes, for example, radar signals, utilizing standard cathode ray tubes involving ordinary phosphorous materials by exploiting and combining the desirable features of the bright-display and the long-persistence cathode ray tubes, respectively.

The present invention essentially consists of a cathode-ray display tube such as a plan position indicating device of conventional construction serving as short-time memory system, of a suitable re-scanning means for re-scanning the picture appearing on the short-time memory system, for instance, with the aid of a suitable image orthicon system or the like, utilizing a very high speed Rho-theta deflection system, of control means operating on the video signals appearing on the bright-display device, for example, with a periodic gain function to obtain a level output signal, and of a bright, final re-display system for re-displaying the re-scanned picture, for instance, on a large cathode ray tube having a coating consisting of a bright phosphorous material.

Ordinarily, electric signals such as radar informations are displayed on conventional plan position indicator tubes having a cathode ray tube provided with a phosphorous coating on the screen such as a P7 phosphor. The diameter of such tube may be of any suitable size, and the deflection system thereof is conventional. Ordinarily, the rotation of the deflection system is relatively slow, synchronized with the rotation of the antenna system, and may be, for example, of the order of 20 r.p.m. For purposes of proper operation in the present invention, the display on such plan position indicator tubes is preferably bright enough so that targets are sufficiently discernible, even in the most decayed areas of the screen thereof.

According to the present invention, the display on such plan position indicator tube is thereupon projected by means of any suitable known optical system onto the photo cathode of an image orthicon tube of known construction. This image orthicon tube is scanned by means of a deflection coil system similar to a conventional Rho-theta deflection system, with the exception that it is rotated at relatively high speeds, for example, of the order of 1,800 r.p.m. Additionally, the image orthicon tube is swept with a high-frequency sweep current, for example, of the order of 15 kilocycles producing radial sweeps.

Referring now to the drawing, and more particularly to FIGURE 1, reference numeral 10 generally designates therein a conventional plan position indicator system utilizing a conventional cathode ray tube, for example, a P7 phosphor cathode ray tube. The deflection system 11 including deflection coils, which is of the conventional Rho-theta scanning type, is rotated mechanically from any suitable drive means 12, for instance, from an electric motor, at any desired rotational speed, for example, at 20 r.p.m. through a suitable mechanical connection 13 connecting the deflection coils 11 of the plan position indicator 10 with the driving motor 12. The exact rotational speed of motor 12 is not significant insofar as this invention is concerned, it being understood that it may vary to suit the particular needs and purposes with which the bright display system according to the present invention is used.

An image orthicon system generally designated by reference numeral 15, which may be of conventional construction and includes a suitable optical system 16 and a conventional deflection coil system 17, is used to re-scan the picture appearing on the screen of the cathode ray tube 10. The axis of the image orthicon system 15 is thereby aligned concentrically with the axis of the plan position indicator system 10.

The deflection coil system 17 of the image orthicon assembly 15 is rotated from a driving source 18, for example, again in the form of an electric motor at any suitable speed, for instance, at 1800 r.p.m. through a suitable mechanical connection 19. If the deflection system 11 of the plan position indicator 10 and the deflection system 17 of the image orthicon assembly 15 rotate in the same direction at the speeds mentioned hereinabove, i.e., if the relative rotational speeds are assumed to be 20 and 1800 r.p.m., then the high-speed Rho-theta scanning system 17 of the image orthicon system 15 overtakes the low-speed scanning system 11 of the plan position indicator 10 by 1800−20=1780 times per minute, or approximately 29.6 times per second.

This means that under these conditions the high-speed scanning system 17 scans the entire display picture on the screen of the plan position indicator 10 from the most decayed area thereof to the brightest area thereof at this rate of 1780 times per minute and that the video signals appearing in the output 29 from the image orthicon system 15 will vary accordingly in amplitude at this rate because the amplitude of the video output signals, during the scanning of the decayed areas of the screen of plan position indicator 10, will be low, and as scanning proceeds into the brighter areas thereof, will become correspondingly larger.

The mechanical connections 13 and 19 connecting motors 12 and 18 with the deflection systems 11 and 17, respectively, also drive a mechanical differential generally designated by reference numeral 20 which may be of any suitable known construction and the differential output shaft 21 of which rotates a synchronization pulse generator of any suitable desired structure generally designated by reference numeral 22. The differential output shaft 21 thereby rotates at the differential speed of 1780 r.p.m. for the rotational speeds of the motors 12 and 18 which have been assumed hereinabove. In the illustrated embodiment, the sync pulse generator 22 includes a permanent magnet 23 mounted on shaft 21 or on a shaft operatively connected therewith so as to rotate in unison therewith and thereby inducing in the coil 24 a sync pulse during every rotation of the magnet 23. However, it is understood that any other type of known sync pulse generator may be used in the place of the one schematically illustrated herein. The sync pulses produced in the sync pulse generator 22 are applied to a gain-function wave-form generator 25 over line 26. The purpose and function of this gain-function wave-form generator 25 will become more clear from the following description. The output 27 from the gain-function wave-form generator 25 is applied to a video amplifier 28 or chain of amplifiers to control the gain characteristics thereof in a manner which will be more fully described hereinafter. The output from the image orthicon system 15 containing the video signals obtained from the re-scanning of the screen of the plan position indicator 10 is applied over line 29 to the input of the video amplifier 28, and the output of amplifier 28 is applied to the input of the final bright-display cathode ray tube 30 over line 31. The final bright-display tube is a conventional bright-display cathode ray tube and includes a deflection coil system 32 driven also by motor 18 through connection 19.

Reference numeral 35 designates a deflection-current generator producing the necessary currents of appropriate wave form for the deflection systems 17 and 32 of the image orthicon system 15 and the bright-display tube 30, respectively, which are operated in synchronism. The generator 35, which produces, for example, a scanning or deflection frequency of fifteen kilocycles, may be of any suitable conventional construction and its outputs are applied to the deflection coil systems 17 and 32 over lines 36 and 37, respectively.

It can be readily demonstrated that if the video amplifier 28 is caused to vary its gain in a predetermined manner, then the output from the video amplifier can be maintained constant regardless of the periodically varying input which of necessity exists, as pointed out hereinabove, by reason of the fact that the high-speed rotational scanning rate as determined by motor 18 scans the entire picture of the plan position indicator system 10 from the most decayed area to the brightest area at a relative high scanning rate, for example, at 1800 r.p.m. so that the video output of the image orthicon system 15 as appears on line 29 and which constitutes the input to the video amplifier 28 varies in amplitude at the rate of 1780 times per minute because the output from the image orthicon during the scanning of the decayed areas on the screen of plan position indicator 10 will be low and as scanning proceeds into brighter areas will become larger.

The desired wave form necessary to vary the gain of the video amplifier can be generated by suitable conventional circuitry. In general the output of the gain function wave generator 25 will be a saw-tooth-like wave with each tooth being of exponential form and of a repetition frequency rate of 1780 per minute or about 29.6 per second for the values 20 r.p.m. and 1800 r.p.m. for motors 12 and 18, respectively. In order to maintain synchronization of the gain function control voltage produced by the generator 25 in a bright-display system according to this invention, the sync pulses produced in the sync pulse generator 22 are applied over line 26 to the generator 25. Since circuits that may be used in the generator 25 as well as the design considerations thereof are well known, per se, in the art, a description of the details thereof is dispensed with herein. However, it is understood that any known generator and/or circuitry may be used for that purpose.

As the video amplifier 28 is controlled in its gain characteristics by the saw-tooth wave-control voltage applied thereto from generator 25 over line 27, the resulting picture appearing on the screen of the final bright-display cathode ray tube 30 will be bright and evenly illuminated.

FIGURE 2 indicates a conventional display on a plan position indicator system as might be expected to be found on the screen of the plan position indicator 10. At position #100, the output from the image orthicon system 15 appearing on line 29 would be as shown in FIGURE 3(a). The amplitude of the video signals in line 29 corresponding to positions #200 and #300 would then vary as indicated in FIGURES 3(b) and (c) due to decay on the screen of the plan position indicator system 10, it being assumed that scanning proceeds from a more decayed to a gradually less decayed area from position #100 to positions #200 and #300.

However, by utilizing a gain control in the video amplifier 28, as described hereinabove, the output of the video amplifier 28 as would appear in line 31 would produce essentially the same peak amplitudes for the signals corresponding to positions #100, #200 and #300 by reason of the gain control voltage applied thereto over line 27 in the form of a saw-tooth wave form, thereby compensating for varying signal-to-noise levels as may occur in decayed areas on the screen of plan position indicator 10.

FIGURE 3(d) thereby shows the amplitude of the video signals as would appear in the output or video amplifier 28 on line 31. Similarly, FIGURE 3(e) shows the signals in line 31 corresponding to those of FIGURE 3(b) in line 29, and FIGURE 3(f) illustrates the video signals appearing in line 31 that correspond to those of FIGURE 3(c) in line 29. From a comparison of FIGURES 3(a), (b) and (c) with FIGURES 3(d), (e) and (f), it can be readily seen that the signals applied to and displayed on the final bright-display cathode ray tube 30 are of approximately equal amplitude notwithstanding the differences in relative amplitudes as appeared in the output of the image orthicon system 15 due to the periodic decay of the respective portions of the screen of the plan position indicator 10. Consequently, the system according to this invention eliminates in a simple and effective manner the deficiencies that would otherwise result from the decay characteristics caused by the relatively slow rotational scanning used with the initial display tube 10.

The following theoretical considerations underlie the present invention, though it is understood that the same is not limited thereto:

The resolving power of the system in accordance with the present invention depends on the screen of the plan position indicator 10 having a screen of long-persistence phosphorous material, as well as on the high-speed Rho-theta scanning system 18, 19, 17 and 32. If it is assumed that a three-inch radius plan position indicator tube 10 having a P7 phosphor screen is used and that the smallest picture element that can be displayed thereon is about 0.015 inch in diameter, it follows therefrom:

$$1 \text{ radius} = \frac{3}{0.15} = 192 \text{ elements} \quad (1)$$

In the system according to the present invention, the 192 elements are scanned at the high frequency rate of 15,000 times per second so that the video output of the image orthicon 15 will be $15,000 \times 192 = 2.88$ megacycles. This frequency of 2.88 megacycles is correct only if the current utilized for purposes of scanning is of perfect saw-tooth wave shape and if all of the slope thereof can be effectively used. In practice, however, the flyback time is appreciable, and if this is the case, the video frequency will be much higher in proportion. For example, if only fifty percent of the saw-tooth period is usable, then the video frequency will be doubled and will become 5.76 megacycles.

From the foregoing consideration, it becomes apparent that the video amplifier band width of the video amplifier channel 28 to be used in the system according to the present invention will have to be from about fifteen kilocycles to six megacycles. Since, however, video amplifiers are readily available at the present state of technology meeting these prerequisites, these band-width requirements can be readily satisfied.

The angular or azimuthal resolution of the system in accordance with the present invention is related to the rate of rotation as well as to the sweep frequency utilized in the scanning system. By reason of the obvious conflict between scanning efficiency and persistence of the bright phosphorous material, a compromise is in order for the system according to the present invention. This is so as a rotation rate that is relatively slow would provide a thorough scanning, however, the final display tube 30 which has a screen made of relatively bright phosphorous material offering relatively short persistence would probably show some flickering on its screen. For a rate of rotation, for example, of the order of 30 r.p.s. which is above normal flicker frequency, the angular resolution of the system can be calculated as follows:

$$\frac{30 \times 360°}{15,000} = 0.72° \quad (2)$$

In actual use with a radar system, this resolution would be smaller than the theoretically smallest target that can be displayed on the plan position indicator 10 from a radar installation the antenna azimuthal resolution of which is of the order of 1.5° to 2.0°.

However, it is also readily within the scope and spirit of the present invention to provide an interlace system of any known, appropriate construction with a field frequency of fifteen cycles per second, which would then produce in the system of the present invention an angular resolution of 0.36°.

If it is assumed that the resolving power without interlace in a system according to the present invention is about 0.72° for the values assumed hereinabove, then each frame would consist of five hundred radial lines. If a frame consisting of five hundred radial lines is displayed on a large tube of, for example, 16 inch diameter, the resulting display might resemble fine "spoking." However, in an analogous system in which the re-display function would be obtained by the use of a memory tube and of a conventional television raster-type scan, there would exist a similar defect because the picture would then be divided into fine lines which can also impair the quality of the picture. Consequently, from this point of view, these limitations on a system according to this invention are no more serious than those that would be encountered in a system utilizing conventional storage tubes.

If it is assumed that on the final tube 30 of sixteen inch diameter, the spot can be focused to 0.015 inch diameter, then the diameter of the screen that will be completely covered, that is the diameter at which the spots no longer overlap but come to lie edge to edge, would be:

$$\frac{500 \times 0.015}{\pi} = 2.4 \text{ inches}$$

Anything within the circle of such 16 inch tube having a diameter of 2.4 inches would be completely covered, whereas anything outside would be displayed somewhat in the manner of spokes. These spokes would be spaced from each other at the largest diameter of such 16 inch tube a distance which is as follows:

$$D = \frac{16 \times \pi}{500} = 0.1 \text{ inch}$$

If an interlaced system is used, then this distance D becomes $$D' = \frac{0.1}{2} = 0.05 \text{ inch}$$

A comparison of the system according to the invention with a conventional television raster-type scanning system scanning a 16 inch tube at five hundred lines and producing a vertical spacing of the line $$d_v = \frac{16}{500} = 0.032 \text{ inch}$$

indicates that the system in accordance with the present invention compares favorably with an analogous television raster-type scan system of the type commonly accepted in the television industry.

The foregoing theoretical considerations clearly indicate that from a quality point of view the system according to the present invention is comparable to an analogous system utilizing a memory tube or the like together with a conventional television raster-type scanning system. Under these circumstances, the elimination of the need for such memory tube to cancel the decay characteristics that are normally encountered with a long-persistence cathode ray tube in connection with a plan position indicator offers decided advantages over the systems presently in use.

Moreover, the angular resolutions of the system can be greatly improved by utilizing a deflection current in the deflection coils 17 and 32 that departs from the conventional approximately saw-tooth-like wave shape of the deflection currents used in the prior art.

Reference is made to FIGURES 4(a) through (d) to explain the possible modification in the scanning current wave shape that may be used in the high-speed Rho-theta scanning systems 17 and 32 of a system according to this invention. FIGURE 4(a) illustrates the desired theoretical saw-tooth deflection current for a Rho-theta scanning system such as for deflection coils 17 and 32. In practice, however, such theoretically desirable saw-tooth deflection current which minimizes the flyback time is unattainable. Instead, the conventional saw-tooth wave shape for the deflection currents that are used with Rho-theta scannning systems, such as deflection coils 17 and 32, assume the saw-tooth wave shape illustrated in FIGURE 4(b). In order to prevent appearance of the flyback traces on the screen of the cathode ray tube, the same is normally biased to cut off and is unblanked by unblanking pulses, as shown in FIGURE 4(c), which are synchronized with the saw-tooth deflection currents.

Since the re-scanning by means of the image orthicon system 15 and the re-display on the final display tube 30, when used even with a radar installation, do not require any particular type of scanning currents, as is necessary with the display of radar targets, as is well known, the present invention proposes to utilize a scanning system taking advantage not only of the radially outward sweep during the scanning operation but also during the radially inward sweep normally reserved for flyback operation. As appears in FIGURE 4(d), the wave shape of the deflection current may be as shown therein to be of modified triangular shape to effectively provide a radial outward and radial inward scanning of the picture appearing on the screen of the plan position indicator 10 and to provide a re-display on the final display tube 30 which utilizes a radial outward followed by radial inward visible scanning. Of course, if so desired, known unblanking techniques may again be used with the scanning system of FIGURE 4(d), though it is obvious that the unblanking pulses, if necessary at all, would then be of much longer duration than the unblanking pulses shown in FIGURE 4(c).

True-motion techniques, as directed for example in the U.S. Patent 2,724,099, filed in the name of B. M. Harrison, may also be readily applied to the bright-display system in accordance with this invention. It is only necessary to utilize the true-motion techniques disclosed in this patent with the plan position indicator tube 10 of the present application. These techniques are preferably applied to the tube 10 rather than to the tube 30 so as to prevent smearing of the picture.

Since the application of the true-motion techniques disclosed in this patent to the present system is obvious, a further detailed description thereof is dispensed with herein.

The present invention thereby offers the additional advantage that the application of true-motion techniques to the present system may be accomplished more readily than in connection with a true-motion attachment because the plan position indicator tube 10 may be relatively small, for example, a three inch tube, thereby requiring less off centering and deflection power for purposes of proper operation with a true-motion system.

Another advantage obtainable with the system of this invention is the fact that any tails due to persistence of the cathode ray tube 10 might be effectively enhanced because of the inherent sensitivity of the image orthicon tube contemplated to be used in the present system.

While we have shown and described one embodiment in accordance with the present invention, it is obvious that the same is not limited to the details shown and described herein since numerous modifications suggest themselves readily to a person skilled in the art. For example, the gain control realized in the system according to the present invention by means of elements 22, 25 and 28 may also be obtained in any other suitable manner, for example, by acting directly on the bright-display tube 30, i.e., by applying a suitable control voltage to an analogous electrode thereof. Furthermore, it is also understood that instead of a single amplifier a plurality of amplifiers may be controlled in their gain, as disclosed in connection with amplifier 28 of this application. Moreover, any other scanning device may be used in the place of the image orthicon system 15.

Furthermore, the system according to this invention is not limited in its use to radar display installations, but may be used for any other purpose exacting similar requirements.

Moreover, infra-red tubes and/or infra-red-sensitive devices may be used in the place of the tubes 10, 15 and 30 of this application and would benefit in an analogous manner by the use of a system such as disclosed herein. Consequently, this invention is not limited to the specific details shown and described herein but is to be construed commensurate with the scope of the appended claims as interpreted by the prior art.

What is claimed is:

1. A bright display system, comprising a plan position indicator means operative as a short-term memory system and including a first cathode ray tube provided with low-speed deflection means, constant sensitivity re-scanning means for re-scanning the picture appearing on said plan position indicator means to produce in the output thereof signals corresponding to the picture on said first cathode ray tube, re-display means including a second cathode ray tube having a display means of short persistence and greater brightness than said first-mentioned display means to display thereon said signals, means for applying the signals from said re-scanning means to said second-mentioned cathode ray tube, and gain adjusting means operative on the signals in said last-mentioned means for obtaining an essentially level output signal on said re-display means.

2. A display system for displaying electric signals on the screen of a short-persistence, bright cathode ray tube, comprising a first cathode ray tube provided with a screen made of long persistence phosphorous material and including rotary scanning means rotating at a first low rotational speed, said first cathode ray tube being operative as a short-time memory tube, rescanning means including image orthicon means provided with a photo-cathode, an optical system intermediate the screen of said first cathode ray tube and said image orthicon means for projecting the display on the screen of said first cathode ray tube onto said photo-cathode, and rotary scanning means for said image orthicon means rotating at a second higher speed, a second cathode ray tube provided with a screen made of bright, short-persistence phosphorous material and including rotary scanning means rotating at said higher speed, means including amplifier means having a variable gain operatively connecting the output from said image orthicon means to said second cathode ray tube, first driving means for driving said first-mentioned scanning means at said lower rotational speed, second driving means for driving said second and third-mentioned scanning means at said higher speed, and control means for periodically varying the gain of said amplifier means essentially at a rate equal to the difference between said higher speed and said lower rotational speed and for effectively offsetting the decay characteristics of said first-mentioned screen.

3. A display system according to claim 2, wherein said second cathode ray tube has a large screen.

4. A display system according to claim 2, wherein said second cathode ray tube has a screen of considerably larger area than said first cathode ray tube.

5. A display system for displaying electric signals on the screen of a bright cathode ray tube, comprising a first cathode ray tube provided with a screen made of long persistence material and including rotary scanning means rotating at a first speed, said first cathode ray tube thereby being operative as a short-time memory tube, re-scanning means including light sensitive means for producing signals in the output thereof corresponding to the display on said first-mentioned screen, a second cathode-ray-tube provided with a screen made of a bright short-persistence material and including rotary scanning means rotating at a second higher speed, means including amplifier means having a variable gain and operatively connecting the output from said light sensitive means to said second cathode ray tube, means for driving said first-mentioned rotary scanning means at said first speed and for driving said second-mentioned scanning means at said second speed, and control means for periodically varying the gain of said amplifier means essentially proportional to the difference in said second and first rotational speeds and for effectively offsetting any decay characteristics of said first-mentioned screen.

6. A display system for displaying electric signals on the screen of a bright cathode ray tube, comprising a first cathode ray tube provided with a screen made of long-persistence material and including rotary scanning means rotating at a first speed, said first cathode ray tube thereby being operative as a short-time memory tube, re-scanning means including light sensitive means for producing signals in the output thereof corresponding to the display on said first-mentioned screen, a second cathode ray tube provided with a screen made of a bright short-persistence material and including rotary scanning means rotating at a second higher speed and deflection means for deflecting the electron beam in a radial direction, means for energizing said deflection means for effectively producing a radially outward followed by a radially inward deflection of the beam, means including amplifier means having a variable gain and operatively connecting the output from said light sensitive means to said second cathode ray tube, means for driving said first mentioned rotary scanning means at said first speed and for driving said second-mentioned scanning means at said second speed, and control means for periodically varying the gain of said amplifier means essentially proportional to the difference in said second and first rotational speeds and for effectively offsetting any decay characteristics of said first-mentioned screen.

7. A display system according to claim 6, wherein said means for energizing said deflection means produces a signal having a modified triangular shape, and means for unblanking the beam of said second cathode ray tube nearly during the entire period of the application to said deflection means of said modified triangularly shaped control signal.

8. A display system for displaying signals on the screen of a cathode ray tube, comprising first cathode ray tube means having long persistence display means and provided with low-speed Rho-theta deflection means, scanning means for scanning said display means for producing signals corresponding to the display on said first-mentioned display means and including an image orthicon provided with high-speed Rho-theta deflection means, second cathode ray means having bright short persistence display means for redisplaying thereon the signals obtained by said scanning means and including high-speed Rho-theta deflection means, a high-speed deflection system connected in common to said scanning means and said second cathode ray means, means for applying the signals from said scanning means to said bright display means, and gain adjusting means operative on the signals in said last-mentioned means for obtaining an essentially level output signal on said re-display means.

References Cited by the Examiner

UNITED STATES PATENTS

| 2,534,610 | 12/50 | Marcy | 343— |
| 2,954,427 | 9/60 | Covely et al. | 178—6. |
| 3,001,192 | 9/61 | Hammond et al. | 343—1 |

FOREIGN PATENTS

| 801,140 | 9/58 | Great Britain. |

OTHER REFERENCES

TV Standards Conversion System, Gibson, RCA Technical Note No. 251, June 1959.

CHESTER L. JUSTUS, *Primary Examiner.*